United States Patent [19]
Gridel

[11] 3,965,503
[45] June 29, 1976

[54] METHOD OF PRODUCING AN ABSORBENT, WASHABLE, PROTECTIVE MATTRESS SHEET AND A SHEET PRODUCED THEREBY

[76] Inventor: Joseph Y. Gridel, 59-Saint Souplet, France

[22] Filed: Nov. 7, 1974

[21] Appl. No.: 521,827

[52] U.S. Cl. ................... 5/334 R; 156/93; 427/365; 427/445; 428/74; 428/76; 428/103; 428/317; 428/321
[51] Int. Cl.$^2$ .................................... B32B 7/08
[58] Field of Search ............. 5/335, 334 R, 90, 347, 5/349; 117/135.5, 111 R, 161 UF; 156/93; 428/74, 76, 102, 103, 321, 317

[56] References Cited
UNITED STATES PATENTS

| | | | |
|---|---|---|---|
| 3,248,904 | 5/1966 | Frishman | 117/111 R |
| 3,467,974 | 9/1969 | Deutsch | 5/334 R |
| 3,563,837 | 2/1971 | Smith et al. | 5/334 R |
| 3,573,964 | 4/1971 | Jones | 117/161 UF |
| 3,635,785 | 1/1972 | Hughes | 5/334 R |
| 3,801,420 | 4/1974 | Anderson | 156/93 |
| 3,888,257 | 6/1975 | Cook et al. | 5/90 |

*Primary Examiner*—Edward G. Whitby
*Attorney, Agent, or Firm*—Sughrue, Rothwell, Mion, Zinn & Macpeak

[57] ABSTRACT

The present invention relates to a protective mattress sheet which is capable of being washed frequently.

To this end, the sheet consists of a layer (6) of waterproof fibers which retain liquids by capillary action contained between two fabric layers (4) and (5), the upper one of which is a wide-meshed fabric and the lower one of which is waterproofed. The protective sheet is bordered by a bias (13). It may also comprise two small lateral grooves, each formed by folding back an edge (14), the small part which is folded back being secured by stitches (18). An absorbent material (17) may be easily introduced into the grooves.

The present invention may be used both for hospital beds and in the hotel industry.

29 Claims, 7 Drawing Figures

U.S. Patent June 29, 1976 3,965,503
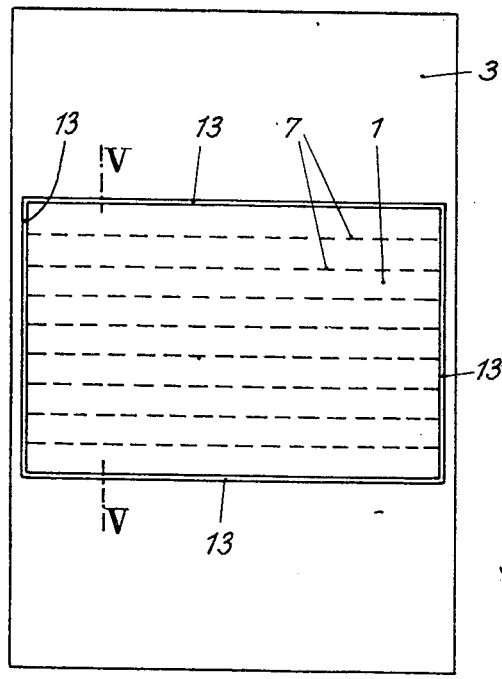
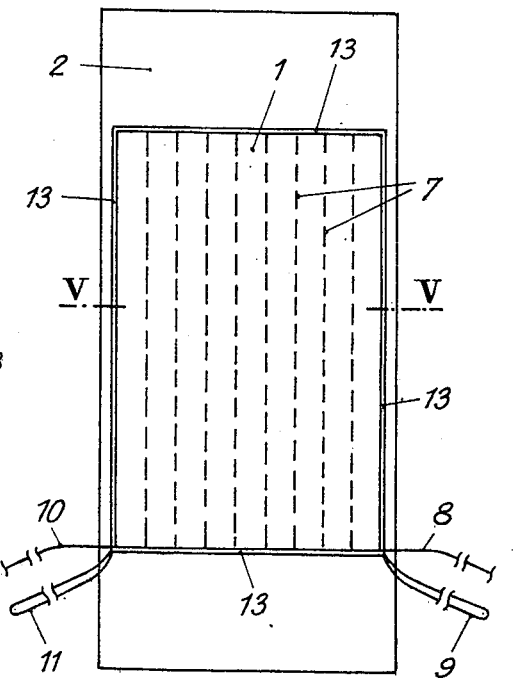
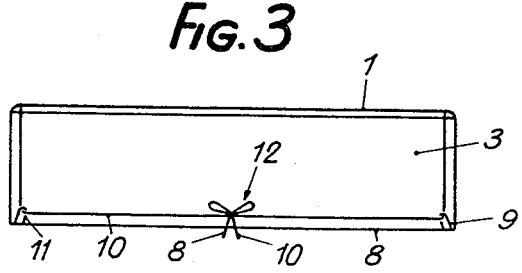
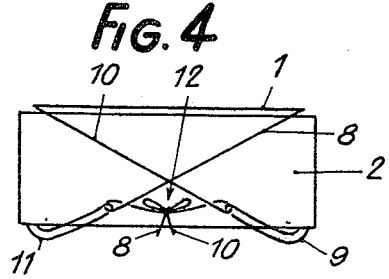
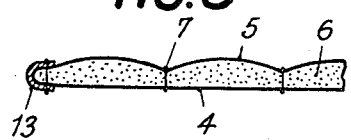
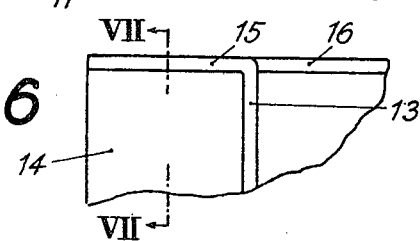

METHOD OF PRODUCING AN ABSORBENT, WASHABLE, PROTECTIVE MATTRESS SHEET AND A SHEET PRODUCED THEREBY

BACKGROUND OF THE INVENTION

1. Field of the Invention

The present invention relates to a method of producing a protective sheet for mattresses and to the end product obtained.

2. Description of the Prior Art

The known methods of producing waterproof sheets for protecting mattresses provide sheets which completely protect the mattress when these sheets are manufactured with sufficiently large dimensions, but they do not meet the requirements imposed by the prolonged confinement of certain patients, particularly in terms of providing a permanently non-humid atmosphere.

The waterproof protective sheets consisting of rubber or some type of plastic material which are placed as a protective measure beneath non-waterproof, absorbent draw sheets have the disadvantage of either not being washable, which results in a major consumption of absorbent products used as non-waterproof covering sheets or, if these absorbent draw sheets are washable, in a senselessly large number of sheet changes owing to the large amount of time which these draw sheets take to dry, since because of the absorption capacity required, these sheets must have some thickness.

SUMMARY OF THE INVENTION

The present invention thus relates to a method of producing a protective sheet which is characterized by the use of a sheet made of a felt consisting of waterproof synthetic fibers or of a material in the form of a strip of continuous waterproof threads or of a material produced by superposing layers of waterproof synthetic fibers oriented essentially in the same direction and which is further characterized in that this sheet is loosely joined together by a bonding agent producing bonds which are directed essentially perpendicular to the layers such that the sheet remains inflated, the weight of the same being between 120 and 300 g per $m^2$, and further in that a meshed or woven fabric is placed on each of the faces of the sheet, the threads in this fabric being spaced apart by at least 0.4 mm, and the sheet and the two pieces of fabric are joined by stitching along lines spaced apart by at least 2 cms and in that one of the faces of the product is waterproofed, the waterproofing temperature remaining lower than the polymerization temperature or softening temperature of the bonding agent.

The protective sheet which is obtained has numerous advantages. It consists of a single part which thus facilitates handling and storage. It is absorbent, owing to the infiltration of liquids between the synthetic fibers distributed in inflated layers, which infiltration preferably follows the direction of the fibers through capillary action. It is waterproof even in the case of profuse discharges, and it dries very rapidly after washing owing to the water repellant nature of the fibers.

Thus, protective sheets of infinitely superior quality to the best draw sheets disclosed in the prior art are obtained.

By way of example, a protective sheet according to the invention possesses a water retention capacity of 800 g/$m^2$ with an inner layer of 140 g/$m^2$. The sheet dries in the open air within two to three hours.

These features are obviously retained whatever the variations in the form of the protective sheet. The protective sheet may comprise attachment elements for securing it to the mattress.

Other objects, features and advantages of the present invention will be made apparent in the following detailed description of a preferred embodiment thereof which is provided by way of example only.

BRIEF DESCRIPTION OF THE DRAWINGS

FIGS. 1 and 2 are diagrammatic plan views of a first embodiment of a protective sheet according to the invention.

FIGS. 3 and 4 are diagrammatic elevational views corresponding to FIGS. 1 and 2.

FIG. 5 is a section along the line V—V of FIGS. 1 and 2.

FIG. 6 is a plan view of a protective sheet with a corner removed, and

FIG. 7 is a sectional view along the line VII—VII of FIG. 6.

DESCRIPTION OF THE PREFERRED EMBODIMENT

The protective sheet which is designated by the reference number 1 in FIGS. 1 – 5 may be in any desired form and, if desired, may be cut from manufactured strips comprising a layer 6 consisting of distended fibers, a first waterproofed sheet of fabric 4 on one of the faces of the protective sheet, a sheet of fabric 5 with a wide mesh or wide weft, the spacing of the adjacent threads being on the order of 0.5 – 2 mm, situated on the other face of the protective sheet 1, and stitches 7 which are spaced apart by at least 1 – 2 cms and possibly by up to 15 – 30 cms.

The layer 6 consists of light superposed layers of synthetic waterproof fibers. The fibers may consist, for example, of polyester, polyamide or of any other similar material which is capable of producing resilient waterproof fibers. As these fibers are known per se, they will not be described, but it is preferable to use fibers having a very small section so as to obtain the largest possible retention surface functioning by capillary action for a given mass. A hollow fiber of about 6 deniers is suitable for this purpose. By using layers on the order of 20 – 60 g per $m^2$, it is easy to obtain low density sheets, their density preferably being on the order of 120 – 300 g per $m^2$.

The layers are joined by a conventional bonding agent which is preferably injected perpendicular to the direction of the fibers so as to increase the resistance of the sheets to repeated washing. As the processes for joining the fibers at at least one point by means of a bonding agent are conventional, there is no need to describe these processes, which generally consist of a pulverization operation. To obtain a distended sheet, every effort is made to prevent compression of the fibers. This has the added advantage of permitting suitable penetration of the bonding agent.

The sheet of fabric 5 is preferably formed of synthetic or waterproof fabric with a very wide mesh or weft so that liquids can easily pass therethrough. The sheet of fabric 5 preferably consists of polyamide threads having the additional property of having a very low resistance to friction. However, it is also possible to use acrylic or polyester fabrics etc. The fibers can consist of the same material.

The sheet of fabric 4 may be waterproofed by any process on condition that the process used does not require a temperature close to the polymerization temperature of the agent used to bond the fibers of the layer 6. For example, plastification of the layer 6 is avoided by coating and calendering the selected waterproof product at a temperature not exceeding 160°C under a pressure of 3 – 4 kg if the polymerization temperature of the bonding agent is about 220°C and softening and plastification of the sheet occurs at about 200°C in the calendering operation. To prevent the formation of folds and accumulations of fibers in the course of the coating operation, the fibers are preferably directed longitudinally and, for the same reason, are parallel to the joining stitches. These stitches may be made with a polyamide or polyester thread.

A preferred coating method consists in gluing on a sheet of polyvinyl chloride which has first been stretched. The calendering operation is then carried out under a pressure of 3 – 4 kg at a temperature of 130° – 160°C. In this way, a totally waterproof product is obtained which has a high liquid retention capacity, is machine washable at 60°C, and can be dried in five hours in the open air.

This waterproofing operation has the added advantage of producing a protective sheet of which the surface to be applied to the mattress is not slippery and thus the sheet does not have to be secured to the mattress.

The coating of the sheet of fabric 4 can also be carried out by employing the scraper process, which enables a finer coating and improved adhesion to be obtained at a lower cost. Owing to the small quantity of polyvinyl chloride which is employed, the scraper coating process can be carried out at about 200°C, for example at between 198° and 205°C, without deforming the polyamide mesh which remains constantly below 200°C and thus constantly below the softening point of about 215°C.

The edges of the sheet are protected by a simple overcast seam or by a bias 13, preferably consisting of a synthetic or waterproof material which is bonded or stitched with care being taken to include both the edge of the sheet of fabric 5 and the waterproofed sheet of fabric 4.

The overcast seam or bias 13 can be used for the attachment of means for securing the sheet to the mattress.

If the sheet is designed to cover the entire surface of the mattress, which is especially the case with invalid's beds, a simple flexible band can be attached at each corner of the sheet, each end of the elastic band being stitched to the bias on one of the sides of the corner.

When the protective sheet is simply designed to protect mattresses in hotels, it is possible to use sheets of the same dimension placed longitudinally on the mattresses of single beds as shown in FIG. 2 and transversally on mattresses of double beds. Instead of flexible bands, it is possible to attach to each corner of the protective sheet a strap 8 or 10 and a loop 9 or 11. In the case of a wide bed such as the one shown in FIG. 3, the loops 9 and 11 can be passed beneath the mattress and the straps 8 and 10 can also be passed beneath the mattress and through the loops 9 and 11, respectively. The ends of the straps can then be tied in a bow 12 to hold the sheet perfectly in place. When the sheet is placed on a single bed, as shown in FIG. 4, the same procedure can be adopted, but the straps 8 and 10 should be crossed and passed through the loops 11 and 9. This method of securing the sheet is obviously represented by way of example, and instead of the strap 8 it is possible to provide a flexible band having a hook which cooperates with the loop 11 and another hook which cooperates with the loop 9 - if this is necessary. This avoids the need to tie the straps 8 and 10 in the bow 12.

When the protective sheet is to be used to protect mattresses where large quantities of liquids can be expected, the edge 14 of the sheet is folded back as shown in FIG. 6 and the ends 15 of the folded edge are secured to the edge 16 by adhesive or stitches 18. In this way, a groove is produced on each side which can be filled with any absorbent material 17 as shown in FIG. 7.

The fabrics used may also be non-woven fabrics which are resistant to repeated washing.

It would obviously not constitute a departure from the scope of the present invention if the distended waterproof sheet were replaced by a felt consisting of waterproof fibers. Although this variant has reduced rapid drying properties for the same weight over the sheet described above, it may be suitable for use when the frequency or quantities of liquids likely to come in contact with the protective sheet are only minimal.

As these felts are known per se, they will not be described. However, it is preferable to use felts having a somewhat distended nature. This is obtained, for example, by reducing the density of stitches in the fiber layers constituting the felt.

The distended waterproof sheet may also consist of a material in the form of a strip of continuous threads. Materials of this type are currently used in industry.

What is claimed is:

1. A method of producing a protective sheet comprising two outer layers protecting an inner layer of fibers, the outer layers being joined by stitching, one of the faces of the protective sheet being waterproofed after the sheet has been stitched together, this method being characterized in that the inner layer comprises a felt made of waterproof synthetic fibers or superposed layers of waterproof synthetic fibers oriented essentially in the same direction and in that this inner layer is loosely joined by a bonding agent thus producing bonds directed essentially perpendicularly to said outer layers such that the sheet remains distended, in that the outer layers are placed on each of the faces of the inner layer, one of the outer layers comprising a mesh the spacing of which is at least 0.4 mm, in that the joining stitches are spaced apart by at least 2 cm, and in that one of the faces of the other one of the outer layers is waterproofed by a process during which the temperature is kept lower than the polymerization temperature or softening temperature of the bonding agent.

2. A method of producing a protective sheet as claimed in claim 1, wherein the layers are joined laterally by an overcast seam.

3. A method as claimed in claim 1, wherein the sheet is waterproofed by a coating operation.

4. A method as claimed in claim 1, wherein the waterproofing is produced by means of a fine coating of polyvinyl chloride, this coating operation being effected with a scraper at a temperature of about 200°C such that the temperature of the coated mesh remains constantly lower than its softening temperature.

5. A protective sheet produced by the method claimed in claim 1, wherein the stitches joining the layers are parallel and the waterproof fibers are acrylic, polyester or polyamide fibers, characterized in that each layer of waterproof fibers forming the inner sheet consists of fibers oriented essentially parallel to each other, each layer resting on the preceding layer so that the general orientation of the fibers is that of the joining stitches.

6. A protective sheet as claimed in claim 5, wherein the fibers are hollow.

7. A protective sheet as claimed in claim 5, wherein the fabric pieces protecting the sheet are made of synthetic or waterproof material, the stitching thread consisting of polyamide or polyester.

8. A protective sheet as claimed in claim 5, comprising an absorbent part contained between a single waterproof layer folded back on itself, characterized in that said absorbent part is housed in two grooves consisting of two opposite folds in the protective sheet which is folded back on itself so as to cover two non-waterproofed parts of the surface, only the edges of the protective sheet which are perpendicular to the folds being stitched together so as to render the absorbent part immobile.

9. A protective sheet produced according to the method claimed in claim 1, characterized in that the inner layer has a high retention capacity for water, the lower waterproofed layer and the upper layer consisting of waterproof protective sheets having a loose weft to facilitate the passage of liquids from the upper layer into the inner layer.

10. A protective sheet as claimed in claim 5, wherein the meshed protective fabrics consist of polyamide or polyester.

11. A protective sheet for mattresses, said protective sheet comprising:
  a. a waterproofed sheet of fabric;
  b. a layer of distended waterproof fibers superposed on one side of said waterproofed sheet of fabric;
  c. a sheet of fabric composed of threads having a wide mesh superposed on the side of said layer of distended fibers opposite to said waterproofed sheet of fabric; and
  d. means for holding said waterproofed sheet of fabric, said layer of distended fibers, and said sheet of fabric having a wide mesh in the recited relationship.

12. A protective sheet as claimed in claim 11 wherein the spacing of adjacent threads in said sheet of fabric having a wide mesh is on the order of 0.5 – 2 mm.

13. A protective sheet as claimed in claim 12 wherein said means comprises stitches which are spaced apart by at least 1 – 2 cms.

14. A protective sheet as claimed in claim 13 wherein said stitches are spaced apart by up to 15 – 30 cms.

15. A protective sheet as claimed in claim 11 wherein said layer of distended waterproof fibers comprises light superposed layers of synthetic fibers.

16. A protective sheet as claimed in claim 15 wherein said fibers are formed of polyester, polyamide, or a similar material which is capable of producing resilient waterproof fibers.

17. A protective sheet as claimed in claim 16 wherein said fibers are hollow fibers on the order of about 6 deniers, whereby the largest possible retention surface functioning by capillary action for a given mass is obtained.

18. A protective sheet as claimed in claim 15 wherein said light superposed layers of synthetic waterproof fibers are joined by a bonding agent extending perpendicularly to the direction of the fibers so as to increase the resistance of the sheet to repeated washing.

19. A protective sheet as claimed in claim 11 wherein said sheet of fabric having a wide mesh is formed of polyamide threads.

20. A protective sheet as claimed in claim 11 wherein said means comprises a bias attached to the edges of both said waterproofed sheet of fabric and of said sheet of fabric having a wide mesh.

21. A protective sheet as claimed in claim 20 wherein said bias is made of a waterproof material.

22. A protective sheet as claimed in claim 11 wherein opposite edges of the sheet are folded back a small way, the folded back edges are secured to the main part of the sheet to produce grooves, and the grooves are filled with an absorbent material.

23. A protective sheet as claimed in claim 11 wherein the fibers in said layer of distended fibers are directed longitudinally.

24. A protective sheet as claimed in claim 23 wherein the fibers in said layer of distended fibers are parallel to said means.

25. A protective sheet as claimed in claim 11 wherein the fibers in said layer of distended fibers are parallel to said means.

26. A protective sheet as claimed in claim 13 wherein the fibers in said layer of distended fibers are parallel to said stitches.

27. A method of producing a protective sheet comprising two outer layers protecting an inner layer of fibers, the outer layers being joined by stitching, one of the faces of the protective sheet being waterproofed after the sheet has been stitched together, this method being characterized in that the inner layer comprises a felt made of waterproof synthetic fibers or superposed layers of waterproof synthetic fibers oriented essentially in the same direction and in that this inner layer is loosely joined by a bonding agent thus producing bonds directed essentially perpendicularly to said outer layers such that the sheet remains distended, in that the outer layers are placed on each of the faces of the inner layer, one of the outer layers comprising a mesh the spacing of which is at least 0.4 mm, in that the joining stitches are spaced apart by at least 2 cm, and in that the waterproofing of the said other one of the outer layers is obtained by the adhesion of a polyvinyl chloride sheet, characterized in that said sheet is applied under a pressure of 3 –4 kgs, the layer receiving said sheet having a softening and plastification temperature of about 200°C.

28. A protective sheet produced by a method of producing a protective sheet comprising two outer layers protecting an inner layer of fibers, the outer layers being joined by stitching, one of the faces of the protective sheet being waterproofed after the sheet has been stitched together, this method being characterized in that the inner layer comprises a felt made of waterproof synthetic fibers or superposed layers of waterproof synthetic fibers oriented essentially in the same direction and in that this inner layer is loosely joined by a bonding agent thus producing bonds directed essentially perpendicularly to said outer layers such that the sheet remains distended, in that the outer layers are placed on each of the faces of the inner layer, one of the outer layers comprising a mesh the spacing of which is at least 0.4 mm, in that the joining stitches are spaced apart by at least 2 cm and in that one of the faces of the other one of the outer layers is waterproofed by a process during which the temperature is kept lower than the polymerization temperature of softening temperature of the bonding agent wherein the stitches joining the layers are parallel and the waterproof fibers are acrylic, polyester or polyamide fibers, characterized in that each layer of waterproof fibers forming the inner sheet comprising fibers oriented essentially parallel to each other, each layer resting on the preceding layer so that the general orientation of the fibers is that of the joining stitches and wherein the section of the fibers is on the order of 6 deniers and the weight of the inner sheet is on the order of 100–300 g. per m², characterized in that the weight of the fiber layer is 20 – 60 g.

29. A protective sheet produced by a method of producing a protective sheet comprising two outer layers protecting an inner layer of fibers, the outer layers being joined by stitching, one of the faces of the protective sheet being waterproofed after the sheet has been stitched together, this method being characterized in that the inner layer comprises a felt made of waterproof synthetic fibers or superposed layers of waterproof synthetic fibers oriented essentially in the same direction and in that this inner layer is loosely joined by a bonding agent thus producing bonds directed essentially perpendicularly to said outer layers such that the sheet remains distended, in that the outer layers are placed on each of the faces of the inner layer, one of the outer layers comprising a mesh the spacing of which is at least 0.4 mm, in that the joining stitches are spaced apart by at least 2 cm, and in that one of the faces of the other one of the outer layers is waterproofed by a process during which the temperature is kept lower than the polymerization temperature of softening temperature of the bonding agent wherein the stitches joining the layers are parallel and the waterproof fibers are acrylic, polyester or polyamide fibers, characterized in that each layer of waterproof fibers forming the inner sheet comprising fibers oriented essentially parallel to each other, each layer resting on the preceding layer so that the general orientation of the fibers is that of the joining stitches and wherein the protective sheet comprises means for securing the sheet to the mattress, and a lateral, stitched bias characterized in that said securing means is stitched to the bias at each corner of the protective sheet.

* * * * *